E. E. GEESEMAN.
DUMPING WAGON.
APPLICATION FILED OCT. 16, 1908.

948,092.

Patented Feb. 1, 1910.

Witnesses
C. K. Davis
Myron H. Cleas.

Inventor
E. E. Geeseman
By C. L. Parker
Attorney

UNITED STATES PATENT OFFICE.

EARLE E. GEESEMAN, OF CUBA, ILLINOIS.

DUMPING-WAGON.

948,092.  Specification of Letters Patent.  Patented Feb. 1, 1910.

Application filed October 16, 1908. Serial No. 458,095.

*To all whom it may concern:*

Be it known that I, EARLE E. GEESEMAN, citizen of the United States, residing at Cuba, in the county of Fulton and State of Illinois, have invented certain new and useful Improvements in Dumping-Wagons, of which the following is a specification.

My invention relates to dumping wagons, and the object thereof is to provide a simple, inexpensive and durable apparatus which may be installed upon the ordinary wagon, to enable the same to be readily dumped.

Figure 1:
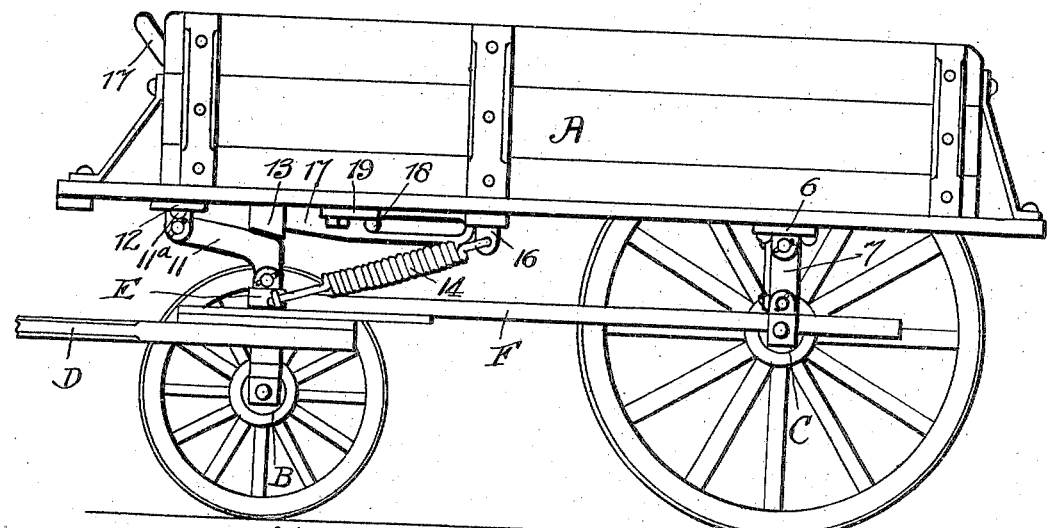
Figure 2:
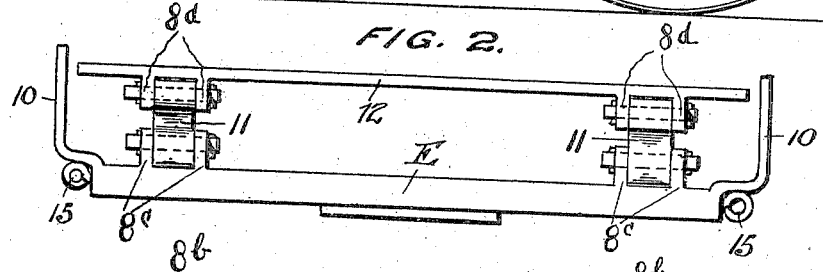
Figure 3:
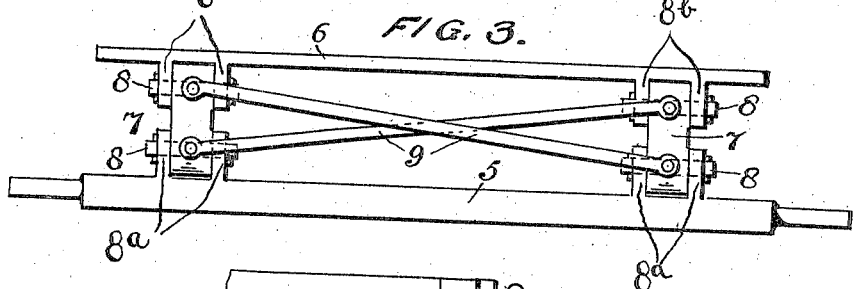
Figure 4:
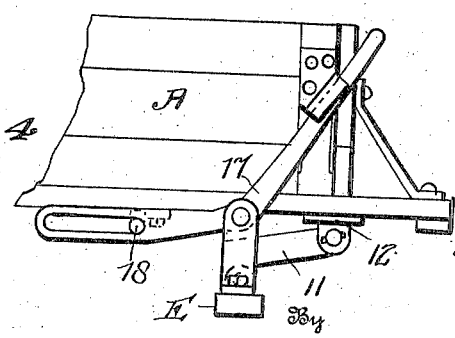

In the accompanying drawings, illustrating my invention, and forming a part of this specification, and wherein like characters are used to designate like parts throughout the several figures, Figure 1 is a side elevation of a wagon provided with my improved dumping apparatus, with the near side wheels and other parts removed. Fig. 2 is a front elevation of the forward bolster and connecting members, constructed in accordance with my invention. Fig. 3 is a similar view of the rear axle and connecting members, and, Fig. 4 is a side elevation of the forward portion of the wagon body, illustrating the operating lever for moving the same to the position for dumping.

In the accompanying drawings, is illustrated the ordinary box-body wagon, including the box-body A, and the running gear therefor, embodying forward and rear wheel trucks B and C, the forward truck B being provided with the forwardly extending tongue D, and being rotatable with respect to its bolster E, which is connected to the rear truck C by the reach F.

In accordance with my invention, the axle 5 of the rear truck C is provided with spaced outstanding ears 8$^a$ and is connected to a transverse cross bar 6, provided with spaced outstanding ears 8$^b$ and bolted upon the base of the body A, by means of relatively wide spaced links 7, extending vertically in the normal position of the wagon, and pivotally mounted between said outstanding ears of cross bar 6 and axle 5, at the upper and lower ends thereof respectively, by pins 8. The links 7 may be supported by crossed truss bars 9 connecting the same.

The bolster E of the forward truck B is provided with vertical upwardly extending arms 10, at its ends, and said bolster E is connected to the body A, at a point forwardly of the vertical plane thereof, by relatively wide L-shaped links 11, substantially greater in length than the links 7 connecting the axle 5 and the rear portion of said body A, said links 11 being pivotally mounted between the outstanding ears 8$^c$ upon said bolster E and the outstanding ears 8$^d$ upon a cross bar 12 extending transversely along and secured upon the base of said body A by means of the bolt 11$^a$. The body A is provided with a transverse cross piece 13, rearwardly of the cross bar 12, adapted to rest upon the upper portion of the vertical extension of the links 11, when said body is in its normal horizontal position, in order to take the weight of said body off of the ends of the forward horizontal extension of said links. Thus by virtue of the forward extending portions of links 11, and the cross piece 13 resting upon the vertical portions thereof, the body A is maintained in its normal horizontal position. Retractile coil springs 14, are attached to the screw-eyes 15 upon the ends of the bolster E, and to eyes 16 upon the wagon body to assist in maintaining said body in its normal horizontal position, and to take up a part of the shock when said body is moved longitudinally, and its rear end lowered.

Operating levers 17 having upwardly extending handle portions projecting upwardly along the sides of the body A, adjacent the forward end thereof, are pivotally mounted at the upper end of the arms 10 extending from the ends of the bolster E and are provided with lower horizontal portions having longitudinal slots therein, within which project pins 18, extending from brackets 19 secured upon the base of said body.

The operation is as follows: When the handles of operating levers 17 are forced downwardly, the forward end of the body A is forced upwardly, and said body is moved longitudinally at the same time, by virtue of the angularity and connection of the forward supporting links 11 the rear end of said body being simultaneously lowered. In this movement, as before stated, the retractile coil springs 14 serve to take up a portion of the shock, and they also return the body to its normal position, as illustrated, when the load thereof has been dumped.

Having fully described my invention, I claim:

1. In a wagon, a body, separate forward and rear wheel-trucks provided with spaced outstanding ears, forward and rear cross strips secured to the bottom of said body and provided with spaced outstanding ears, relatively wide substantially L-shaped links having the extremities thereof pivotally mounted between said outstanding ears of said forward wheel truck and said forward cross strip and relatively wide vertical links having the extremities thereof pivotally mounted between said outstanding ears of said rear wheel-truck and said rear cross strip, substantially as and for the purpose described.

2. In a wagon, a body, separate forward and rear wheel-trucks provided with spaced outstanding ears, forward and rear cross strips secured to the bottom of said body and provided with spaced outstanding ears, relatively wide substantially L-shaped links having the extremities thereof pivotally mounted between said outstanding ears of said forward wheel truck and said forward cross strip, a supporting cross strip secured to the bottom of said body and arranged to engage said L-shaped links and relatively wide vertical links having the extremities thereof pivotally mounted between said outstanding ears of said rear wheel-truck and said rear cross strip, said L-shaped links and said vertical links being adapted to entirely support said body, substantially as and for the purpose described.

3. In a wagon, a body, forward and rear wheel-trucks, said forward wheel-truck comprising an axle provided with a bolster vertically pivoted thereon, said bolster being provided with spaced upstanding ears and upwardly projecting arms adjacent the extremities thereof, angular operating levers pivoted to said arms at points adjacent the upper extremities thereof, said levers comprising upwardly extending handle portions and rearwardly extending horizontal portions, said horizontal portions having a slot extending longitudinally therein, pins suitably secured to the base of said body and inserted within said longitudinal slot, and adapted to slide therein, a cross strip secured to the bottom of said body adjacent the forward end thereof and provided with spaced oustanding ears, relatively wide substantially L-shaped links having the extremities thereof pivotally mounted between said spaced ears of said bolster and said cross strip, said rear truck comprising an axle provided with spaced outstanding ears, a cross strip provided with spaced outstanding ears secured to the bottom of said body near the rear end thereof and relatively wide links having the extremities thereof pivotally mounted between said spaced ears of said second named cross strip and said axle of said rear truck, substantially as and for the purpose described.

4. In a wagon, a body, wheel trucks connected thereto, each of said wheel trucks comprising an axle provided with spaced members, spaced members arranged upon said body, swinging members pivotally mounted between said spaced members upon each of said axles and said body, whereby said body may be moved longitudinally when the forward end thereof is raised, and means for raising said forward end of said body, substantially as described.

In testimony whereof I affix my signature in presence of two witnesses.

EARLE E. GEESEMAN.

Witnesses:
J. W. TURALL,
CLYDE D. SMITH.